United States Patent [19]
Hanke

[11] Patent Number: 5,194,045
[45] Date of Patent: Mar. 16, 1993

[54] RESILIENT DAMPING COUPLING FOR INSTALLATION IN A DRIVE LINE OF A MOTOR VEHICLE

[75] Inventor: Wolfgang Hanke, Heidenheim, Fed. Rep. of Germany

[73] Assignee: J. M. Voith GmbH, Fed. Rep. of Germany

[21] Appl. No.: 554,335

[22] Filed: Jul. 17, 1990

[30] Foreign Application Priority Data
Jul. 18, 1989 [DE] Fed. Rep. of Germany ....... 3923749

[51] Int. Cl.⁵ ............................ F16D 3/80; F16D 3/12
[52] U.S. Cl. ........................................ 464/24; 464/68; 192/106.2; 74/574
[58] Field of Search ............... 464/24, 68, 27, 66; 192/106.2, 70.17; 74/574

[56] References Cited

U.S. PATENT DOCUMENTS

| | | | |
|---|---|---|---|
| 4,274,524 | 6/1981 | Nakane | 464/68 X |
| 4,351,167 | 9/1982 | Hanke et al. | 464/24 |
| 4,614,261 | 9/1986 | Takeuchi | 464/68 X |
| 4,714,449 | 12/1987 | Woerner et al. | 464/68 |
| 4,848,551 | 7/1989 | Caspar | 464/68 X |
| 4,856,636 | 8/1989 | Meinhard | 192/70.17 |
| 4,884,996 | 12/1989 | Schmitt et al. | 464/68 |
| 4,906,220 | 3/1990 | Wörner et al. | 464/24 X |
| 4,976,656 | 12/1990 | Bacher et al. | 464/68 |
| 5,030,166 | 7/1991 | Wörner et al. | 464/24 |

FOREIGN PATENT DOCUMENTS 3329420 2/1985 Fed. Rep. of Germany ........ 464/24

Primary Examiner—Daniel P. Stodola
Assistant Examiner—William G. Battista, Jr.
Attorney, Agent, or Firm—Grimes & Battersby

[57] ABSTRACT

A resilient coupling has a hydraulic damping appliance for torsional oscillations. Between a first and a second coupling half there is provided a suspended damping ring, which is not connected in a form-locking manner with either of the two coupling halves, but which forms displacement chambers of different sizes with both coupling halves. In this way the coupling is in a position to counteract torsional oscillations having small amplitudes with weak damping and oscillations having large amplitudes with strong damping. From the kinematic point of view the suspended damping ring is at any one time a component of the first or the second coupling half.

14 Claims, 2 Drawing Sheets

RESILIENT DAMPING COUPLING FOR INSTALLATION IN A DRIVE LINE OF A MOTOR VEHICLE

The invention relates to a resilient coupling with a damping appliance and, more particularly for a vehicle drive, having a suspended damping ring that can rotate a restricted amount. Couplings of this type are intended to protect the subsequent driving line from torsional oscillations when driven by internal combustion engines. The damping capacity of the resilient coupling normally attached to the engine flywheel plays a special part in critical operating conditions.

A resilient coupling having a hydrodynamic damping appliance is known from West German Patent Specification 28 48 748. In a radially outwardly disposed displacement chamber, enclosed damping medium is displaced through determined gaps. The resultant damping increases proportionally to the torsion angle of the two coupling halves. However, the torsion angle is dependent on the load and consequently so are the damping characteristics of the coupling, irrespective of the amplitudes of oscillation which occur in the respective loading conditions. In this known coupling, precautions were taken so that only slight damping is achieved by means of enlarged gaps with small torsion angles. However when large torques are transmitted, the coupling can only react with strong damping, although internal combustion engines often produce only low amplitudes of oscillation when high torques develop. The coupling can not differentiate between working ranges having small or large amplitudes of oscillation, but only reacts to the relative rotation of the coupling halves under the effect of the torque to be transmitted. The object of the invention is to create a coupling of the type mentioned at the beginning having a damping appliance, which with simple means independently of the instantaneous torque load, can produce weak damping with small amplitudes of oscillation and strong damping with large amplitudes of oscillation, especially in the resonance range.

This object is achieved by the suspended damping ring of the present invention. According to the invention in the inner chamber of the coupling filled with damping medium there is disposed a so-called suspended damping ring which is not connected in a form-locking manner to either coupling half. With the first coupling half the suspended damping ring forms at least a first displacement chamber and with the second damping half it forms at least a second displacement chamber. In this way this suspended damping ring is exposed to the free play of forces during the relative movement of the two coupling halves, and said ring can be rotated by a restricted amount relative to each of the two coupling halves. Allowing for the inherent mass of the suspended damping ring and also the available gap cross sections, it is thus possible that only one displacement chamber becomes effective for damping with small amplitudes of oscillation. With greater amplitudes of oscillation, and also in particular at lower oscillation frequencies, the second displacement chamber also becomes effective if the limited rotatability of the suspended damping ring relative to one coupling half is exploited and it is still possible to rotate the suspended damping ring relative to the other coupling half. The choice of two separated displacement chambers on a suspended damping ring has the advantage that the coupling can automatically react to the torsional oscillations with a damping dependent on the amplitudes of oscillation and also results in quieter running during load cycle operations.

The following advantageous refinements of the invention are the suspended damping ring can be guided in a rotationally movable and fluid-tight manner between the outer contours of the central disc, i.e. the second coupling half, and the external diameter of the inner chamber, which is formed by the first coupling half. The first displacement chamber, which is formed between the damping ring and the first coupling half, is located on a larger radius than the second displacement chamber between the suspended damping ring and the central disc. The first displacement chamber has a greater volume and extends over a greater torsion angle than the second displacement chamber. Small throttle gaps are also provided in the first displacement chamber and large throttle gaps are provided in the second displacement chamber for the purpose of displacing damping medium. These measures serve to give the two displacement chambers different characteristics, as a result of which the second displacement chamber develops weak damping for small amplitudes of oscillation and the first displacement chamber has strong damping for large amplitudes of oscillation.

The suspended damping ring can be constructed in two parts and encloses the central disc on both sides. In order to form the said second displacement chambers, recesses are provided on the outer circumference of the central disc, into which radially inwardly pointing projections on the suspended damping ring dip with radial and axial clearance. The first displacement chambers, which are larger, are formed by radially outwardly pointing cams, which are positioned on the outer circumference of the suspended damping ring and tightly abut the inner shell surface of the inner chamber radially outwards by means of circular external contours. The first displacement chambers are limited in the circumferential direction by bolts between the lateral discs of the first coupling half. The suspended damping ring may be made of plastic and enclose the central disc on both sides in such a way that its recesses are covered radially inwardly to form the second displacement chambers. The suspended damping ring has lateral walls, and the inner clear width (a) between the lateral walls is greater than the thickness(s) of the central disc, and the outer width (b) between the lateral walls substantially corresponds to the clear width between the lateral discs. The two halves of the suspended damping ring have axially effective expanding members in the region of the outer cams, which force the two halves of the suspended damping ring towards the inner faces of the lateral discs and consequently even bring about supplementary friction damping, if required for determined operating conditions.

The invention is explained in more detail below by means of the drawings, which show an exemplified embodiment.

Figure 1:
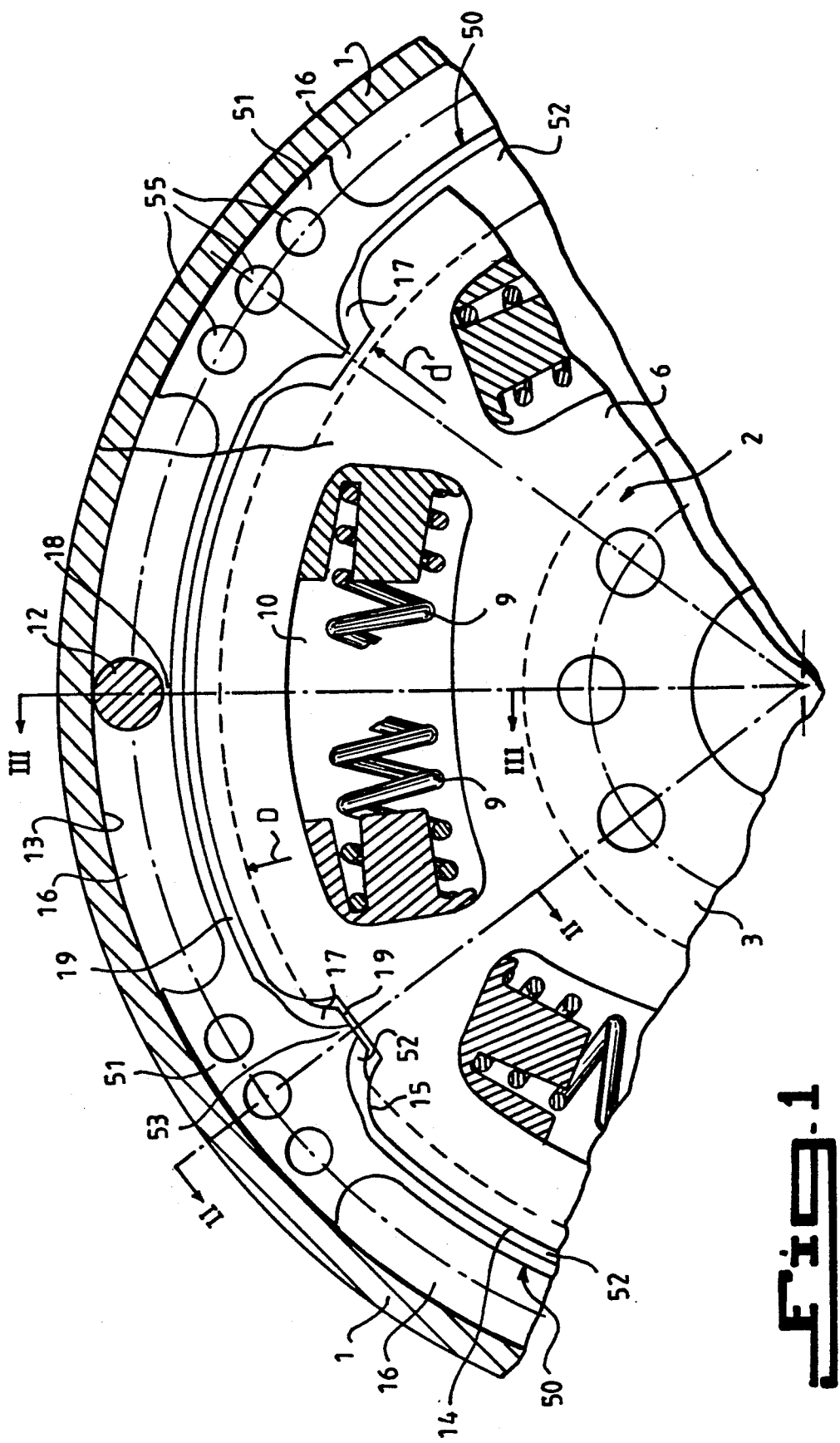
FIG. 1 shows a diagrammatic partial cross section through the coupling as specified by the invention.
Figure 3:
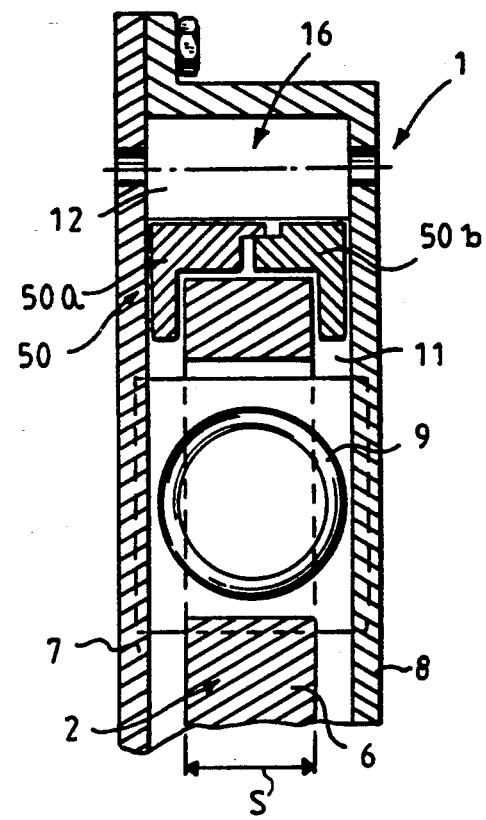
FIG. 3 shows a partial longitudinal section through the coupling along line III—III in FIG. 1.

FIGS. 1 and 3 show diagrammatic sections through the coupling according to the invention with a first coupling half 1, which is connected to a driving engine (not illustrated). A second coupling half 2 is connected to a gear unit (not illustrated) of a vehicle drive. The first coupling half 1 comprises two lateral discs 7, 8, which are connected to the outer circumference and form a fluid-tight inner chamber 11 and enclose the second coupling half consisting of a central disc 6 and a hub 3. The torque is transmitted between the two coupling halves as known via tangentially disposed springs 9, which are accommodated in corresponding recesses 10 in the central disc 6 or in the lateral discs 7 and 8. Between the outer circumference 14 of central disc 6 and the radially outer circumference of the inner chamber 13 there is located a suspended damping ring 50. This is housed with rotational mobility inside the first coupling half 1 and is also guided so that it can rotate by a restricted amount relative to the first coupling half 1 and also to the second coupling half 2, i.e. the central disc 6. However it is not connected in a form-locking manner to either of the two coupling halves 1, 2. However the suspended damping ring 50 forms a radially outer first displacement chamber 16 with the first coupling half 1 and a second displacement chamber 17 with the second coupling half, i.e. the central disc 6. For this purpose the suspended damping ring 50 has several cams 51 on the outer circumference, which with axially disposed bolts 12 between the two lateral discs 7, 8, define the first displacement chambers 16. To form the second displacement chambers the suspended damping ring is provided with radially inwardly pointing projections 53 which protrude into corresponding recesses 15 on the central disc. The two displacement chambers 16 and 17 are not the same size: the first displacement chamber 16 extends over a large torsion angle between the cam 51 and bolt 12 and to overcome this angle the suspended damping ring has to displace the damping medium present in inner chamber 11 through a gap 18 between bolt 12 and the suspended damping ring 50. Damping medium in the second displacement chamber 17 is displaced through gaps 19 between the suspended damping ring and the bulges 15 on the central disc.

As can be seen from FIG. 3 in particular, the suspended damping ring 50 encloses the central disc 6, and lateral parts 52, which point radially inward, form a partial lateral seal for the second displacement chambers 17. The relative rotatability of the suspended damping ring 50 with respect to central disc 6 is restricted by the projections 53 and the sides of recesses 15.

In the exemplified embodiment described it is specified that the torsion angle of the suspended damping ring inside the first displacement chambers 16 is much greater than in the second displacement chambers 17. At the same time the gaps 18 inside the first displacement chambers 16 are clearly narrower than the gaps 19 in the second displacement chambers 17. In this way the two displacement chambers may be allocated different damping properties. Thus in the present case the choice is such that the second displacement chambers assume responsibility for damping oscillations of small amplitudes and only weak damping is produced on the basis of the large radial and axial gaps 19. However because of the narrow gaps 18 in the first displacement chambers 16, the suspended damping ring 50 is assigned to the first coupling half 1 with respect to oscillations, because the first displacement chambers 16 put up a comparatively great torsion resistance relative to the suspended damping ring. Consequently the second displacement chambers 17 are primarily effective in the event of oscillations with small amplitudes and in particular with high frequencies. In the case of oscillations with larger amplitudes, i.e. more particularly when passing through critical rotational speeds, the torsion angle is overcome inside the second displacement chamber 17, with the result that the projections 53 abut the recesses 15 and the suspended damping ring together with central disc 6 is driven as a form-locking unit. In this way damping medium is displaced through gaps 18 in the first displacement chambers 16 and there consequently is strong damping for oscillations with large amplitudes. It is possible to achieve damping which is adapted to the respective type of oscillation by this alternating assignment of the suspended damping ring to one of the two coupling halves, depending on whether the oscillations have small or large amplitudes. It is possible to accommodate various operating conditions, more particularly the typical oscillation behaviour of a specific drive engine, by the appropriate choice of the torsion angles inside the two displacement chambers, and by the appropriate choice of the gaps 18 and 19.

The right-hand side of FIG. 1 shows an alternative design for the second displacement chamber 17. The lateral parts 52 of the suspended damping ring project substantially further in the radially inward direction than the recesses 15 in the central disc 6. As a result the projections 53 on the suspended damping ring 50 abut the sides of the recesses 15 with better damping after overcoming the torsion angle in the second displacement chamber. For this purpose the lateral parts 52 have a minimum diameter d, whereas on the left-hand side of FIG. 1 the lateral parts 52 have a minimum diameter D.

Figure 2:
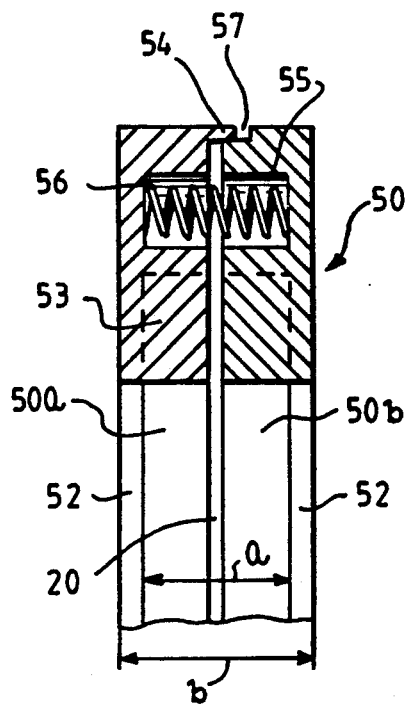
FIG. 2 shows a longitudinal cross section through the suspended damping ring along cutting line II—II in FIG. 1.
Figure 4:
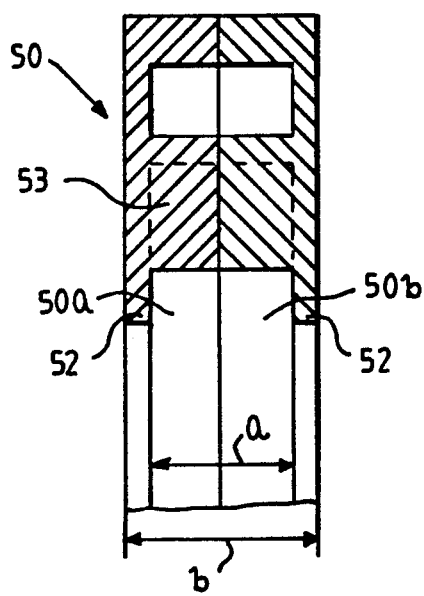
FIG. 4 shows a longitudinal section through an alternative design of the suspended damping ring similar to FIG. 2

From FIGS. 2 and 4, it can be seen that the suspended damping ring 50 is axially divided into two halves 50a and 50b. The two halves 50a and 50b also have axial boreholes 55 into which spring elements are inserted. These springs 56 force the two halves 50a and 50b in the axial direction towards the inner faces of lateral discs 7, 8. As a result there is supplementary friction damping between the suspended damping ring and the first coupling half 1. Centrifugal force also produces internal pressure between the two halves 50a and 50b which further assists the action of the springs 56. According to FIG. 2 a labyrinthine centering can be provided and an outer ring 54 can be resiliently formed on one half 50a, especially if the suspended damping ring is made of plastic. Between the two halves 50a and 50b there is a gap 20 through which damping medium can pass from one displacement chamber to another, with the dimensioning of this gap also helping to optimise the damping capacity of the coupling.

The radially outer gap between the cam 51 and the inner surface 13 of the inner chamber 11 is advantageously chosen so that there is a seal as soon as the operating temperature of the coupling is reached. As a result with comparatively cool damping medium and a larger gap, the damping is approximately the same as with a smaller gap and thinner damping medium. The effects of temperature are compensated by this. The same also applies for the dimensioning of gap 18. The temperature is compensated in the same way at the second displacement chamber 17, and the gaps 19 increase in size with a rise in temperature.

I claim:

1. A resilient coupling for installation in a drive line of a motor vehicle, comprising:
   a) two lateral discs (7,8) connected at their outer circumference in order to rotate together, the two lateral discs define a first coupling half (1) that encloses a second coupling half (2), the second coupling half having at least one central disc (6) associated with a hub (3);
   b) the first coupling half (1) and the second coupling half (2) connected to one another by resilient coupling elements (9) and adapted to rotate a restricted amount relative to one another;
   c) the lateral discs (7,8) define a fluid-tight inner chamber (11) that contains the at least one central disc (6) and is filled with a damping medium;
   d) wherein the inner chamber (11) has a radially outer region and a radially inner region located between the lateral disc (7,8), and wherein the outer region has at least one first displacement chamber (16) and the inner region has at least one second displacement chamber (17) such that both chambers can be filled with the damping medium and both chambers along with their damping medium serve to dampen, and wherein the volume of the chambers can be varied during the reciprocal rotation of the first and second coupling halves (1,2);
   e) a suspended damping ring disposed in the inner chamber (11), the suspended damping ring (50) rotatable by a restricted amount relative to the coupling halves (1,2) during operation;
   f) wherein the suspended damping ring (50) forms the at least one first displacement chamber (16) with the first coupling half (1) and the at least one second displacement chamber (17) with the second coupling half (2), and wherein the at least one first displacement chamber (16) has first throttle gaps (19) for displacing the damping medium; and
   g) wherein the at least one second displacement chamber (17) and the fluid medium therein are the primary means used to dampen when there are small amplitudes of oscillation that occur during normal operation of the motor vehicle.

2. A coupling according to claim 1, wherein the suspended damping ring (50) is guided rotationally and is in a fluid-tight manner with the outer contour (14) of the central disc (6) and an external diameter of the inner chamber (11) formed by the lateral discs (7,8).

3. A coupling according to claim 1, wherein the at least one first displacement chamber (16) is formed by the suspended damping ring (50) and the first coupling half (1) and has a greater volume and extends over a greater torsion angle than the at least one second displacement chamber (17) that is formed between the suspended damping ring (50) and the central disc (6).

4. A coupling according to claim 1, wherein the suspended damping ring (50) is divided in the axial direction and enclosed the central disc (6) on both sides.

5. A coupling according to claim 1, wherein the central disc (6) has an outer circumference (14), and wherein the central disc (6) has recesses (15) into which radially inwardly pointing projections (53) on the suspended damping ring (50) dip with radial and axial clearance to form the at least one displacement chamber (17) in the outer circumference.

6. A coupling according to claim 1, wherein the suspended damping ring (50) has an outer circumference with radially outwardly pointing cams (51), between which the displacement chambers (16) are formed, and the outer contours of which are circular, with the diameter being selected so that the suspended damping ring (50) is movably guided so that there is a seal with the inner shell surface of the first coupling half (1).

7. A coupling according to claim 1, further comprising bolts (12) that are provided between the lateral discs (7, 8) for the tangential definition of the at least one first displacement chamber (16).

8. A coupling according to claim 1, wherein the suspended damping ring (50) comprises lateral walls (52) that enclose the central disc (6) on both sides and cover the recesses (15) in the radially inward direction.

9. A coupling according to claim 1, wherein the suspended damping ring (50) is made of plastic.

10. A coupling according to claim 1, wherein the suspended damping ring (50) has lateral walls (52), and wherein the inner clear width (a) between the lateral walls (52) is greater than the thickness(s) of the central disc (6).

11. A coupling according to claim 1, wherein the suspended damping ring (50) has lateral walls (52), and wherein the outer width (b) between the lateral walls (52) substantially corresponds to the clear width between the lateral discs (7, 8).

12. A coupling according to claim 1, wherein the at least one first displacement chamber (16) and the fluid medium therein are the primary means used to dampen during large amplitudes of oscillation that occur when the motor vehicle is started, shut down or accelerated.

13. A resilient coupling for installation in a drive line of a motor vehicle, comprising:
   a) two lateral discs (7,8) connected at their outer circumference in order to rotate together, the two lateral discs define a first coupling half (1) that encloses a second coupling half (2), the second coupling half having at least one central disc (6) associated with a hub (3);
   b) the first coupling half (1) and the second coupling half (2) are connected to one another by resilient coupling elements (9) and are able to rotate a restricted amount relative to one another;
   c) the lateral discs (7,8) define a fluid-tight inner chamber (11) that contains the at least one central disc (6) and is filled with a damping medium;
   d) wherein the inner chamber (11) has a radially outer region and a radially inner region located between the lateral discs (7,8), and wherein the outer region has at least one first displacement chamber (16) an the inner region has at least one second displacement chamber (17) such that both chambers can be filled with the damping medium and both chambers along with their damping medium serve to dampen, and where the volume of the chambers can be varied during the reciprocal rotation of the first and second coupling halves (1,2);
   e) a suspended damping ring (50) disposed in the inner chamber (11), the suspended damping ring (50) rotatable by a restricted amount relative to the coupling halves (1,2) during operation;
   f) wherein the suspended damping ring (50) forms the at least one first displacement chamber (16) with the first coupling half (1) and the at least one second displacement chamber (17) with the second coupling half (2), and wherein the at least one second displacement chamber (17) has second throttle gaps (19) for displacing the fluid medium, and wherein the second throttle gaps (19) and the fluid medium therein are the only elements used to dampen when there are small amplitudes of oscillation that occur during normal operation of the motor vehicle.

14. A resilient coupling for installation in a drive line of a motor vehicle, comprising:
    a) two lateral discs (7,8) connected at their outer circumference in order to rotate together, the two lateral discs define a first coupling half (1) that encloses a second coupling half (2), the second coupling half having at least one central disc (6) associated with a hub (3);
    b) the first coupling half (1) and the second coupling half (2) are connected to one another by resilient coupling elements (9) and are able to rotate a restricted amount relative to one another;
    c) the lateral discs (7,8) define a fluid-tight inner chamber (11) that contains the at least one central disc (6) and is filled with a damping medium;
    d) wherein the inner chamber (11) has a radially outer region and a radially inner region located between the lateral discs (7,8), and wherein the outer region has at least one first displacement chamber (16) and the inner region has at least one second displacement chamber (17) such that both chambers can be filled with the damping medium, and wherein the volume of the damping medium can be varied during the reciprocal rotation of the first and second coupling halves (1,2);
    e) suspended damping ring (50) disposed in the inner chamber (11), the suspended damping ring (50) being adapted to rotate by a restricted amount relative to the coupling halves (1,2);
    f) wherein the suspended damping ring (50) forms the at least one first displacement chamber (16) with the first coupling half (1) and the at least one second displacement chamber (17) with the second coupling half (2);
    g) wherein the suspended damping ring has two halves (50a, 50b) and between the two halves in the region of outer cams (51) there are provided axially effective expanding members (56) that exert a force directed towards the inner faces of lateral discs (7,8) on the two halves (50a, 50b) of the suspended damping ring (50).

* * * * *